UNITED STATES PATENT OFFICE.

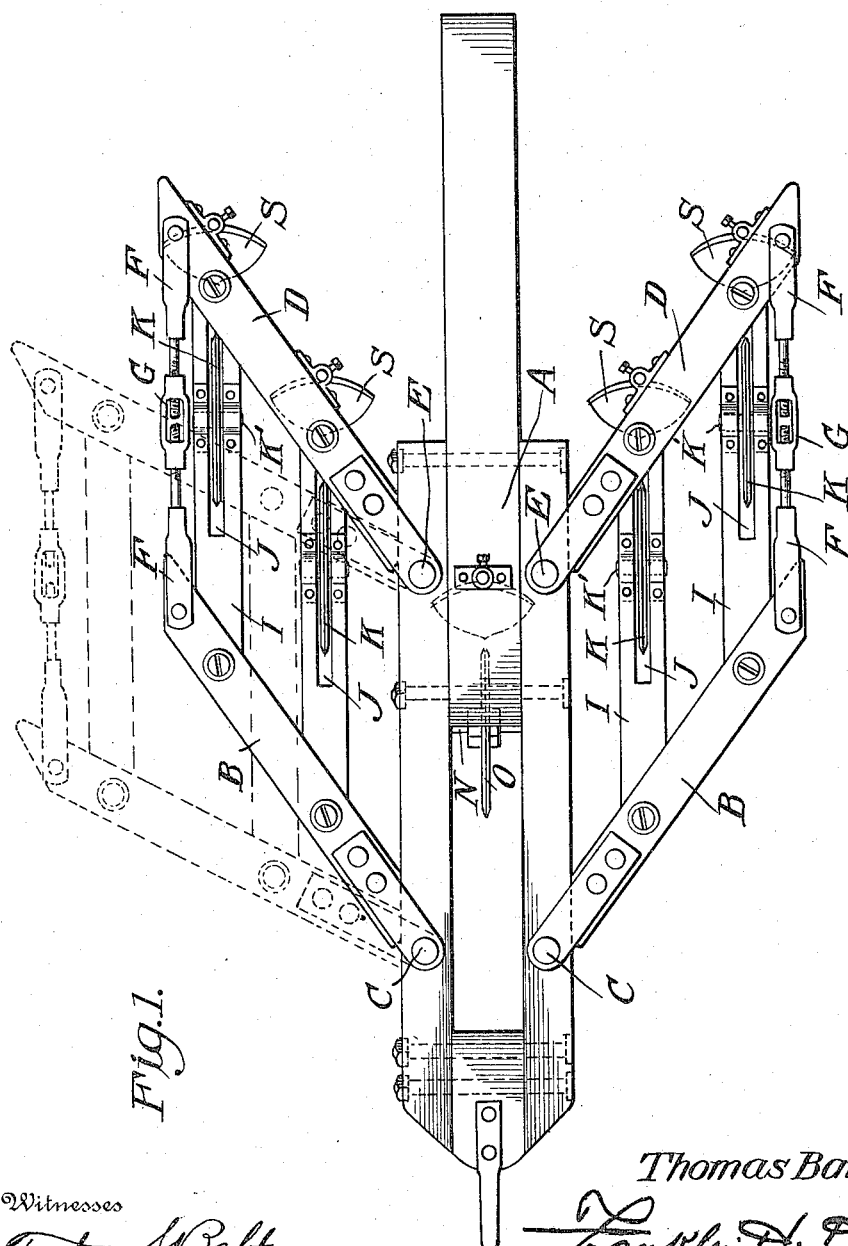

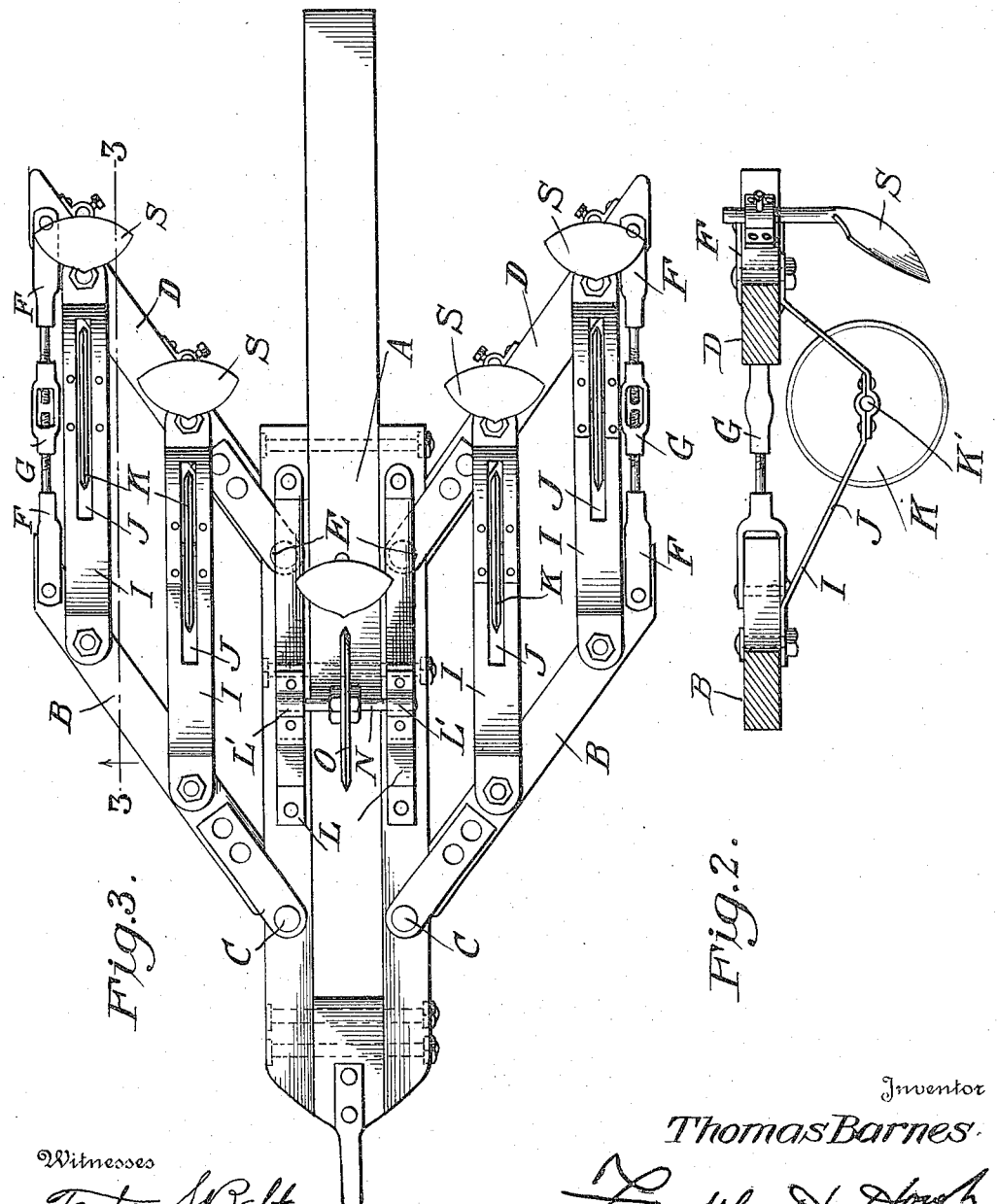

THOMAS BARNES, OF ROCKVILLE, INDIANA.

ROLLER CUTTER ATTACHMENT FOR DRILLS.

1,148,428. Specification of Letters Patent. Patented July 27, 1915.

Application filed November 18, 1914. Serial No. 872,823.

*To all whom it may concern:*

Be it known that I, THOMAS BARNES, a citizen of the United States, residing at Rockville, in the county of Parke and State of Indiana, have invented certain new and useful Improvements in Roller Cutter Attachments for Drills; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in harrows and consists essentially in the provision of a harrow having swinging arms adjustably held together and pivotally mounted upon the harrow frame and in the provision of yielding bowed members upon which the harrow disks are journaled.

The invention consists of various details of construction, combinations and arrangements of parts which will be hereinafter fully described, shown in the accompanying drawings and then specifically defined in the appended claims.

I illustrate my invention in the accompanying drawings, in which:

Figure 1 is a top plan view of my improved harrow. Fig. 2 is a side elevation of a part of the device, and Fig. 3 is a bottom plan view.

Reference now being had to the details of the drawings by letter, A designates a harrow frame of the usual construction and B, B designate beams which are pivotally connected to the frame by means of the pivots C, the forward end of each beam B being inclined and adapted to contact with the sides of the beam A to limit the inner throw thereof. Other beams, designated by letter D of similar construction, are pivotally connected by means of the pivots E to the frame opposite each other. Fork-shaped members F are pivotally connected to the outer end of each beam B and D and a turn buckle G connects the adjacent ends of the members F, adapted to regulate the distance between the same.

Yielding bowed members I are pivotally fastened at their ends to the two beams B and D and each member I is slotted as at J. A disk K is pivotally mounted upon an axis K' which is journaled in suitable bearings in each bowed member, each disk being adapted to turn in a slot in said member. Bracket members L are fastened to the rear side of the frame and have bearings L' therein in which the axle N of the disk O is journaled. Hoes, designated by letter S, are fastened to each beam and to the frame.

In operation, the various beams upon either side of the frame may be moved to different adjusted positions accordingly as it may be desired to change the relative positions of the disks, the parts being held in different positions by the tightening of the bars at their pivotal points in any suitable manner.

What I claim to be new is:—

1. An adjustable harrow consisting of a frame, beams pivotally mounted upon the frame and having their forward ends inclined adapted to contact with the opposite sides of the frame to limit the inner throw of the same, other beams pivotally connected to the frame and connected to the first referred to beams, slotted bowed members connecting the beams on either side, and harrow disks mounted one upon each bowed member and adapted to turn in the slot thereof.

2. In combination with a harrow frame, oppositely disposed beams pivotally mounted toward the forward end of the frame, means for limiting the inner throw of said beams, other beams pivoted behind the first mentioned beams, forked members pivotally connected to the outer ends of each beam, a turn buckle connecting the forked members, slotted bowed members pivotally connecting the beams upon each side of the frame, harrow disks pivotally mounted upon each bowed member and one in each slot therein.

In testimony whereof I hereunto affix my signature in presence of two witnesses.

THOMAS BARNES. [L. S.]

Witnesses:
F. C. YEAGER, [L. S.]
GEORGE J. STARK. [L. S.]

Copies of this patent may be obtained for five cents each, by addressing the "Commissioner of Patents, Washington, D. C."